United States Patent [19]

Dennison et al.

[11] Patent Number: 4,704,862

[45] Date of Patent: Nov. 10, 1987

[54] DUCTED PROP ENGINE

[75] Inventors: William T. Dennison, South Windsor; Robert F. Brodell, Marlborough, both of Conn.

[73] Assignee: United Technologies Corporation, Hartford, Conn.

[21] Appl. No.: 738,703

[22] Filed: May 29, 1985

[51] Int. Cl.⁴ ............................................. F02K 3/02
[52] U.S. Cl. .................................. 60/226.2; 60/226.1
[58] Field of Search ................... 60/226.1, 226.2, 262, 60/263, 268, 39.161

[56] References Cited

U.S. PATENT DOCUMENTS

| | | | |
|---|---|---|---|
| 3,448,582 | 6/1969 | Bracey et al. | 60/226.1 |
| 3,462,953 | 8/1969 | Wilde et al. | 60/226.1 |
| 3,468,473 | 9/1969 | Davies et al. | 60/226.1 |
| 3,620,009 | 11/1971 | Wilde | 60/226.1 |
| 3,673,802 | 7/1972 | Krebs et al. | 60/226.1 |
| 3,688,505 | 9/1972 | Dison | 60/226.1 |
| 3,903,690 | 9/1975 | Jones | 60/39.161 |
| 3,924,404 | 12/1975 | Pollert | 60/226.1 |
| 4,005,575 | 2/1977 | Scott et al. | 60/226.1 |

FOREIGN PATENT DOCUMENTS 978658 12/1964 United Kingdom .
1197711 7/1970 United Kingdom .
1338499 11/1973 United Kingdom .

OTHER PUBLICATIONS

Finch, "Jet Propulsion Turlojets", The National Press, 12-48, p. 301.
Banks, "The Next Step", Forbes, May 7, 1984, pp. 31-33.

Primary Examiner—Louis J. Casaregola
Assistant Examiner—Donald E. Stout
Attorney, Agent, or Firm—Stephen E. Revis

[57] ABSTRACT

In a gas turbine engine with a bypass duct, a rotating stage of airfoils in the bypass duct is supported through and driven by torque transmitting members extending across the core stream flow path, but which are sufficiently flexible in the radial direction to avoid passing centrifugal loads from the rotating stage across the core stream flow path. The rotating bypass stream stage is also supported through a bearing secured directly to the engine main support structure radially outwardly of the core stream flow path. The majority of aircraft maneuver loads are reacted at this bearing, and a minor portion of the maneuver loads pass across the core stream to a bearing located radially inwardly thereof. The airfoils may be either variable pitch airfoils or fixed airfoils. If variable pitch, they may be used to reverse the flow in the bypass duct for thrust reversing.

18 Claims, 4 Drawing Figures

FIG. 3
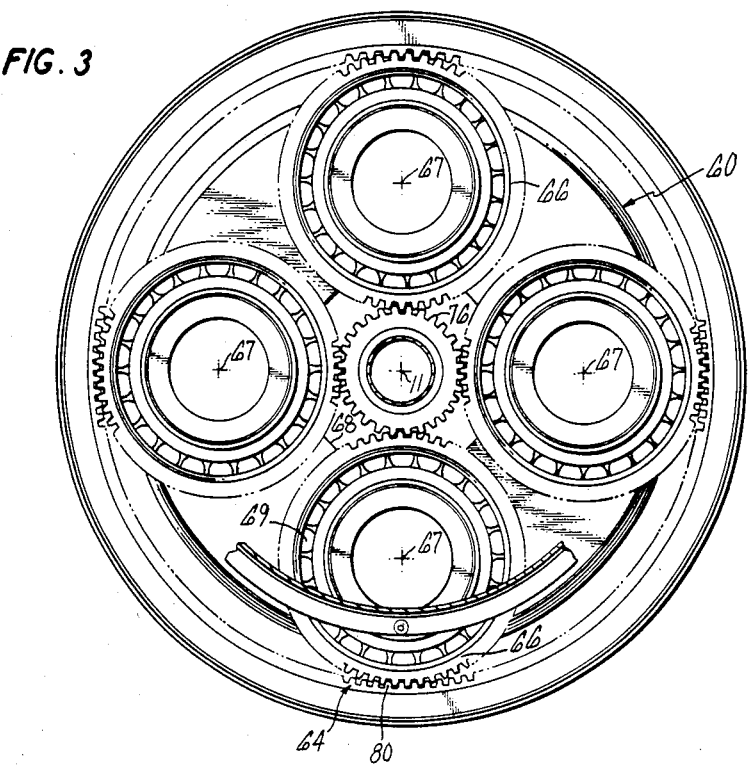
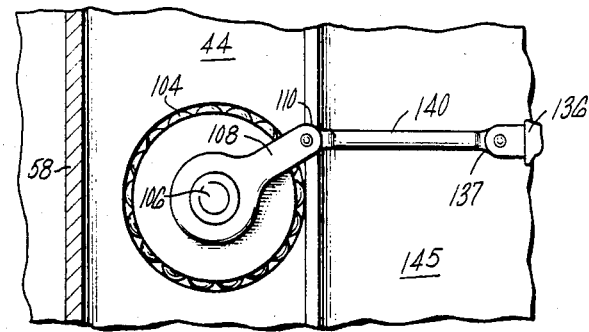
FIG. 4

DUCTED PROP ENGINE

TECHNICAL FIELD

This invention relates to gas turbine engines having bypass ducts.

BACKGROUND ART

Gas turbine engines having a core stream surrounded by a bypass duct are well known in the art. Often a fan stage, driven by the turbine through suitable reduction gearing, is disposed upstream of the core stream inlet. The airfoils on these fans were either fixed pitch or variable pitch. Efficient airfoil contours were difficult to design since fan rotation affected the downstream aerodynamics of both the core and bypass stream and sometimes required inconsistent airfoil shapes in front of each stream for most efficient operation. Compromises often had to be made to satisfy the aerodynamics of both streams. Also, variable pitch fans thus located, which are also used to reverse flow through the bypass duct, may adversely affect flow through the core stream during thrust reversing operation since some of the reverse flow through the bypass duct may be blocked by these fan airfoils and turned into the core stream.

Some bypass engines locate the fan airfoil within the bypass stream downstream of the core stream inlet plane. Several U.S. patents representative of such arrangements are: U.S. Pat. Nos. 3,448,582; 3,468,473; 3,673,802; 3,768,933; 3,924,404; and 4,005,575. In the arrangements shown in those patents, the power to rotate the fan rotor is taken off a core engine shaft. The fan disk is supported solely by a torque transmitting drive member located radially inwardly of the core stream inner flow path wall. All the centrifugal loads created by the rotating airfoils as well as the aircraft maneuver loads on the airfoils and the airfoil disks pass across the core stream flow path and are taken out through core stream wall and structural members. Large loads taken out in this manner can create undesireable deflection in seals and other rotating members within the core stream. These deflections often require the engine to be designed with greater gaps at seals and with larger blade tip clearances, which reduce engine efficiency. These problems increase in magnitude with greater bypass ratios (i.e., the ratio of the bypass mass flow rate to the core stream mass flow rate) requiring larger and heavier fan blades which are more difficult to support.

DISCLOSURE OF THE INVENTION

One object of the present invention is a ducted prop engine with a high bypass ratio.

Another object of the present invention is improved means for supporting a rotating stage of airfoils located in the bypass duct of a gas turbine engine.

Another object of the present invention is to support a stage of rotating airfoils in the bypass duct of a gas turbine engine in a manner which reduces deflection of the bearings which support the disk carrying the airfoils.

Yet another object of the present invention is a ducted prop engine with an easily accessible reduction gearbox for driving a rotating stage of airfoils in the bypass duct.

According to the present invention, in a gas turbine engine having a bypass duct a rotating stage of airfoils in the bypass duct are attached to a disk located downstream of the core stream inlet, wherein the disk is driven by the engine turbine through torque transmitting members extending across the core stream flow path and having sufficient radial flexibility to prevent substantial centrifugal loads on the disk and airfoils from passing through the torque transmitting members across the core stream flow path.

This arrangement is in contrast to prior art ducted fan engines wherein substantially all centrifugal loads on the fan airfoils and disk are transmitted directly radially inwardly across the core stream flow path, and ultimately must pass through cases and other somewhat flexible members causing undesireable deflections requiring increased seal and tip clearances.

In the present invention the engine main support frame is located radially outwardly of the core stream flow path and includes stiff struts/vanes extending across the bypass duct, preferably downstream of the rotating stage of airfoils in the bypass duct. The disk carrying the airfoils is attached directly to the engine main frame by structure located entirely radially outward of the core stream flow path. Aircraft maneuver loads on the disk and airfoils are therefore reacted at the engine main frame partly through a load path leading directly to the main frame radially outward of the core stream flow path, and partly through a load path extending through the torque transmitting members across the core stream flow path and through core stream walls and other internal structure before reaching the main frame. The disk and airfoils in the bypass stream are preferably located to direct the majority of reaction loads into the main frame without passing across the core stream.

In a preferred embodiment of the present invention the disk and its airfoils in the bypass stream are supported through a pair of axially spaced apart bearings, a first bearing being located radially outwardly of the core stream flow path and secured to the main frame, the other being located radially inwardly of the core stream flow path and providing support for the torque transmitting members. The disk is located axially between the two bearings, preferably closer to the first bearing. This arrangement minimizes deflection of the airfoils in the bypass stream by having the disk and airfoils mainly supported directly through the strong main frame. It also reduces deflections in structure located radially inwardly of the core stream flow path by reducing the loads which pass across the core stream flow path.

According to another aspect of the present invention, reduction gearing connecting the turbine and bypass stream disk through the torque transmitting members is located entirely upstream of the engine compressor rotor stages and inwardly of the core stream gas path such that the reduction gearing is accessible and can be removed for service without removing any compressor rotor stages or the bypass stream disk and airfoils assembly.

In accordance with another preferred embodiment, the airfoils in the rotating bypass stream stage are variable pitch airfoils which can be actuated such that flow through the bypass stream reverses direction for reverse thrust operation, thereby eliminating the need for other thrust reversing devices in the bypass stream.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 3 is a simplified sectional view taken generally along the line 3—3 of FIG. 1 showing additional features of the reduction gearing mechanism used in the preferred embodiment of the present invention.

FIG. 4 is a sectional view taken generally along the line 4—4 of FIG. 2 showing additional features of the variable pitch mechanism used in the preferred embodiment of the present invention.

BEST MODE FOR CARRYING OUT THE INVENTION

Figure 1:
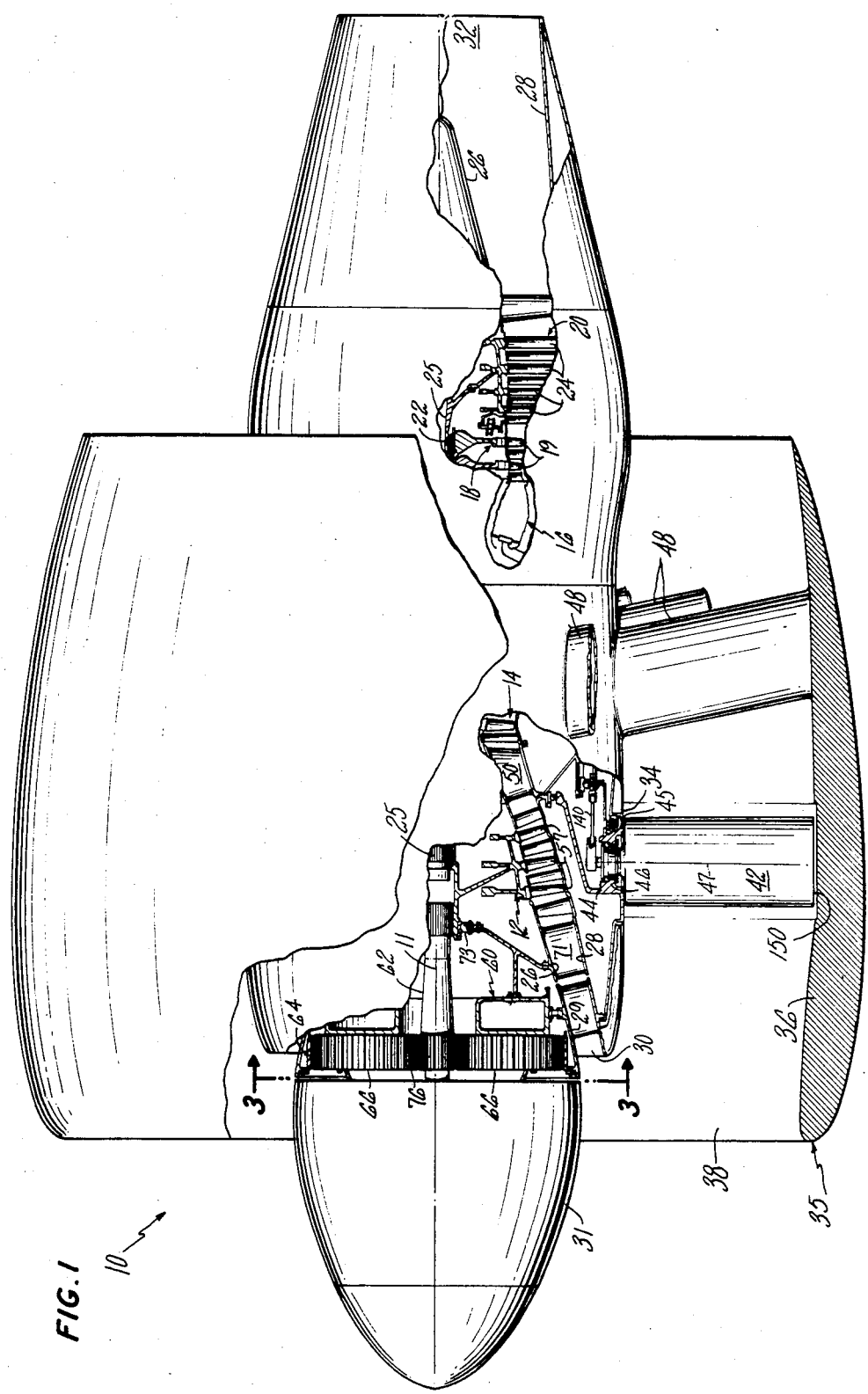
FIG. 1 is a simplified, side elevation view, partly broken away and partly in section, of an axial flow ducted prop gas turbine engine incorporating the features of the present invention.

Consider, as an exemplary embodiment of the present invention, the ducted prop gas turbine engine generally designated by the reference numeral 10 in FIG. 1. The engine 10 had an axis 11 and comprises, in series flow relationship, an axial flow low compressor 12, a axial flow high compressor 14, an annular burner or combustor 16, a high turbine 18, and a low turbine 20. The high turbine 18, which has two rotor stages 19 is connected to and drives the high compressor 14 via a shaft 22. The low turbine 20, which comprises four rotor stages 24, is connected to and drives the low compressor 12 via a shaft 25. Inner and outer concentric walls 26, 28, respectively, define a core stream gas flow path which extends from its inlet 30 to its outlet or exit 32. The inner wall 26 includes a rotatable portion 29 interconnected to the low turbine shaft 25 through reduction gearing 60, as will be further explained hereinafter. A non-rotating nose cone 31 encloses an oil reservoir, oil pump, oil filter and the like, not shown.

The core stream gas flow path is surrounded by inner and outer bypass duct walls 34, 36, respectively, which define a bypass stream gas flow path therebetween having an inlet 38 and an exit 40. The inner wall 34 of the bypass stream flow path includes a rotatable portion 43 which, in this embodiment, includes a disk 44 which is rotatable about the engine axis 11 and is disposed entirely between the core stream and bypass stream flow paths. The rotatable portion 43 extends from the inlet 38 to the downstream edge 45 of the disk. A plurality of circumferentially disposed airfoils 42 are secured to the rim 46 of the disk 44 and extend across the bypass stream flow path. In this exemplary embodiment the airfoils 42 are variable pitch airfoils mounted for rotation about respective radially extending axes 47. Although preferred, variable pitch airfoils are not a requirement of the present invention.

A plurality of airfoil shaped struts 84, circumferentially disposed about the engine axis 11, extend radially across the core stream flow path and integrally connect the rotatable wall portion 29 of the inner wall 26 of the core stream flow path and a rotatable wall portion 86 of the outer wall 28 of the core stream flow path. A thin walled, axially extending cylindrical member 88 connects the struts 84 to the disk 44. More specifically, the axially extending wall of the member 88 has a radially inwardly extending annular flange 90 at its upstream or forward end which is secured, by means not shown (e.g., bolts), to a radially outwardly extending annular flange 92 which is rigidly connected to the rotatable wall portion 86 and the struts 84. A radially outwardly extending flange 94 at the downstream or rearward end of the member 88 is secured to a radially inwardly extending annular flange 96 integral with the disk 44.

Power to rotate the disk 44 and the airfoils 42 is taken from the low turbine 20. In this embodiment the rotational speed of the airfoils 42 about the engine axis 11 is reduced to a small fraction of the rotational speed of the turbine rotors 24 by the reduction gearing 60 located axially entirely forward of the rotors 57 of the low compressor 12 and radially inwardly of the inner wall 26 of the core stream gas flow path. It is accessible for servicing without the need to remove any compressor rotor stages or the assembly of the disk 44 and airfoils 42.

Figure 2:
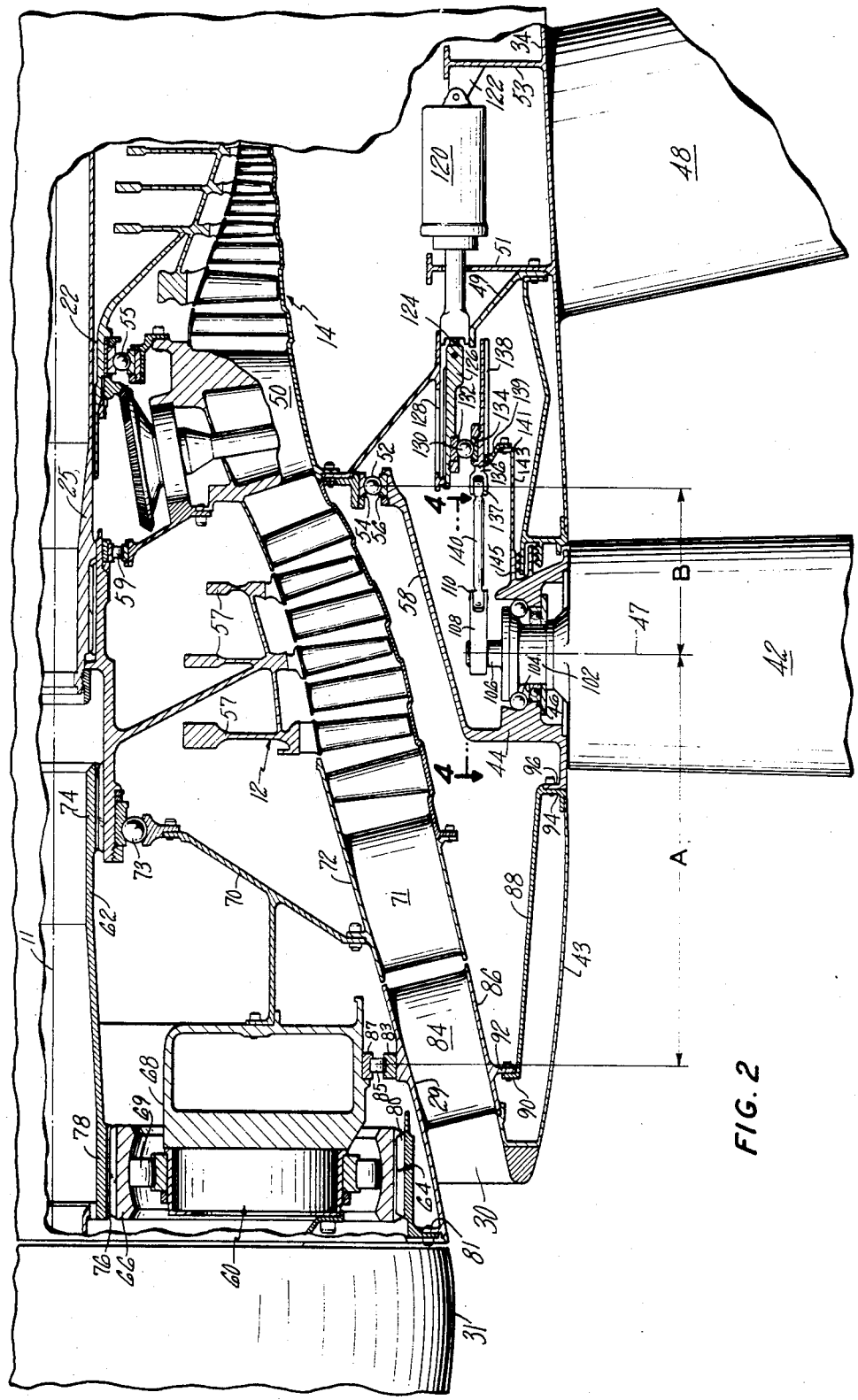
FIG. 2 is a simplified, enlarged view, of the front portion of the gas turbine engine of FIG. 1 showing more detailed aspects of the present invention.

With reference to FIGS. 2 and 3 the reduction gearing 60 comprises a sun gear 62, a ring gear 64, and a plurality of pinion gears 66 mounted within a fixed cage 68 for rotation on bearings 69 about their respective fixed axes 67. The cage 68 is secured, through an annular structural member 70, to a fixed portion 72 of the inner wall 28 of the core stream gas flow path. The radially inner end of the member 70 is supported on the fixed outer race of a thrust bearing 73. The forward end of the low turbine shaft is supported on the rotatable inner race of the bearing 73. The sun gear 62 is splined at its rearward end 74 to the forward end of the low turbine shaft 25. Radially outwardly extending circumferentially disposed gear teeth 76 at the front end 78 of the sun gear mesh with and thereby rotate the gears 66 which, in turn, mesh with the radially inwardly facing gear teeth 80 of the ring gear 64, causing the ring gear 64 to rotate about the engine axis in a direction opposite to the direction of rotation of the low turbine 20 and at a slower speed. The ring gear 64 is connected, through a flange joint 81, directly to the rotatable portion 29 of the core stream flow path inner wall 72 which thereby rotates at the same speed as the ring gear 64. The rotatable wall portion 29 is also radially supported from the rotatable outer race 83 of a roller bearing 85 secured by its fixed inner race 87 to the cage 68. The present invention is not intended to be limited to reduction gearing of the type just described.

A plurality of radially extending fixed exit guide vanes 48 are circumferentially disposed within and extend across the bypass stream flow path downstream of the airfoils 42, connecting the outer bypass duct wall 36 and a fixed portion of the inner bypass duct wall 34, which is a part of the engine nacelle 35. The vanes 48 are connected to low compressor exit guide vanes 50 and to a fixed portion of the outer wall 28 through a conical support member 49. The vanes 50 are structurally stiff and extend across the core stream flow path and carry bearings 55, 59 which support the the high and low compressor shafts 22, 25, respectively. The support member 49 and vanes 48 are radially and torsionally stiff and define the mount frame for the engine through which engine loads pass into an airframe mount system (not shown) for supporting the engine from the aircraft. Radially extending plates 51, 53 shown integral with the wall 34 provide added radial stiffness to the mount frame. A thrust bearing 52 has its fixed inner race 54 secured to the conical support member 49. The disk 44 is mounted on the rotatable inner race 56 of the bearing 52 through a conical support member 58 which is integral with the disk 44.

During engine operation, torque from the low turbine 20 is taken off the shaft 25 by the sun gear 62 and transmitted, via the reduction gearing 60 to the rotatable inner case 29. The inner case 29, struts 84, outer case 86, and cylindrical member 88 rotate together to transmit this torque to the disk 44 causing it and the airfoils 42 to rotate about the engine axis.

Centrifugal forces within the rotating disk and airfoils cause them to grow radially outwardly. Allowance must be made for this growth when setting the nominal or "at rest" clearance between the airfoil tips 150 and the outer bypass duct wall 36. Aircraft maneuver loads on the disk 44 and airfoils 42 must also be taken into account.

To maintain the smallest possible clearance between the tips 150 of the airfoils 42 and the outer bypass duct wall 36 it is desireable to minimize movement of the airfoils 42 due to maneuver loads and centrifugal loads. Also, it is desireable to minimize the loads passing from the disk 44 and airfoils 42 through the reduction gearing and into the core stream static structure to enable these parts to be made as light as possible and to minimize deflection of core stream walls, seals and the like, as well as to minimize deflections within the reduction gearing. In this regard, the cylindrical torque transmitting member 88 is designed to be sufficiently flexible in the radial direction so as not to pass substantial centrifugal loads from the disk 44 and the airfoils 42 into the guide vanes 84. These centrifugal loads are carried almost entirely by the disk 44 and relatively stiff conical support member 58.

Aircraft maneuver loads on the disk 44 and airfoils 42 are reacted at the bearings 52, 85. The ratio of the load at one bearing to the load at the other bearing is substantially inverse to the ratio of the distance (e.g., A) of the one bearing from the plane of the axes 47 to the distance (e.g., B) of the other bearing to the same plane. Loads passing through the bearing 85 ultimately pass into the reduction gearing cage 68, structural member 70, structural and aerodynamic vanes 71, and ultimately into the support member 49 through the outer core stream wall 28. It is therefore preferred, and the present invention makes it possible, to have the plane of the axes 47 closer to the bearing 52 than the bearing 85, such that the majority of the maneuver loads are reacted directly by the engine mount frame, which includes the bypass exit guide vanes 48 and support member 49.

Most preferably no more than 40% of the maneuver loads on the disk 44 and airfoils 47 are taken through the bearing 85. Because the majority of these maneuver loads are reacted through relatively stiff, strong support member 49 and the vanes 48, deflection of the airfoils 42 is reduced (and tip clearance control is improved) during maneuver conditions. Tip clearance thus becomes strongly dependent on the structural characteristics of the support member 58 which connects the disk 44 to the bearing 52. The bearings 52 are rigidly attached to the structurally stiff vanes 50 and support member 49, which minimize deflection of the bearing 52 due to the maneuver loads. The bearing 52 is also isolated from deflections of the inner bypass duct wall 34, which deflections are damped by the support member 49 before they reach the bearing 52.

As hereinabove mentioned, in this exemplary embodiment the pitch of the airfoils 42 may be varied. More specifically, as shown in FIGS. 2 and 4, each airfoil 42 includes a trunnion 102 rotatably disposed within bearings 104 mounted within the disk 44. Each trunnion 102 includes a radially inwardly extending cylindrical button 106 integral therewith and having an axis coaxial with the axis 47 of the airfoil. One end of a drive arm 108 is secured to the button 106. The arm has a clevis 110 at its outer end. Each of a plurality of circumferentially spaced apart actuators 120 (only one of three actuators are shown in the drawing) is secured to the stiffener plate 53 by means of a bracket 122. An actuation rod 124 of each actuator 120 is connected to an inner cylindrical unison ring 126 concentric with the engine axis 11. The ring 126 is connected by axial splines on its inside surface to corresponding axial splines on the external surface of a cylindrical guide member 128. The guide member 128 is integral with the support member 49. The unison ring 126 can move axially, but is prevented from rotating by the splined connection to the guide member 128. The unison ring 126 carries a bearing 130. The inner race 132 of the bearing 130 is secured to and fixed relative to the unison ring 126. The outer race 134 of the bearing 130 is secured to and fixed relative to another cylindrically shaped unison ring 136, concentric to and spaced radially outwardly of the ring 126. The forward end of the ring 136 includes a plurality of uniformly circumferentially spaced apart clevises 137, one corresponding to each airfoil 42. Actuation links 140 connect each drive arm 108 of each airfoil 42 to the outer unison ring 136 by means of clevis type connections at opposite ends of each link 140 such that the links 140 can rotate in a plane perpendicular to the axis 47 of the vane to which it is connected.

The outwardly facing surface of the outer unison ring 136 includes axially extending spline teeth 138. An annular, internally splined anti-rotation member 139 is attached, as by bolts, to the flanged end 141 of a cylindrical support tube 143. The tube 143 has its other end 145 integral with or otherwise secured to the disk 44. The spline teeth of the anti-rotation member 139 engage the spline teeth 138 and prevent rotation of the unison ring 136 relative to the disk 44 while permitting axial movement of the ring 136.

With the pitch varying mechanism described above, the airfoils may be simultaneously rotated about their axes 47 as they rotate about the engine axis 11. Note that the actuators 120 do not rotate. Thus, as the disk 44 rotates, so do the drive arms 108, links 140, anti-rotation member 139, outer unison ring 136, and bearing outer race 134. On demand, the actuators 120 simultaneously move both the non-rotating unison ring 126 and rotating unison ring 136 in the axial direction, which results in rotation of the airfoils 44 about the axes 47 through movement of the links 140 and drive arms 108.

In this preferred embodiment, when the airfoils 42 are rotated about their axes 47 to the maximum extent (i.e., the actuator rods 124 are fully extended) the air flow in the bypass stream flows in a reverse direction from normal to effect thrust reversing for landing and other aircraft maneuvers.

It should be apparent that, although the engine of this preferred embodiment is a twin spool engine, the present invention could equally well be used with a single spool engine.

It should be understood by those skilled in the art that other various changes and omissions in the form and detail of the invention may be made without departing from the spirit and scope thereof.

We claim:

1. A gas turbine engine for an aircraft, said engine having an axis, a front end, and a rear end, said engine comprising, in series flow relationship, axial flow compressor means, combustor means, and turbine means, including inner and outer concentric core stream wall means spaced apart defining a core stream annular gas flow path therebetween having an inlet and including the flow path of said axial flow compressor means;

bypass duct means surrounding said compressor means, including inner and outer concentric bypass duct wall means defining an annular bypass stream flow path therebetween surrounding said core stream flow path;

a disk disposed entirely between said core stream gas flow path and said bypass stream flow path downstream of said core stream flow path inlet and rotatable about said engine axis;

a plurality of circumferentially disposed airfoils secured to said disk and extending across said bypass stream flow path;

stationary engine support structure disposed radially outwardly of said core stream gas flow path and extending from said outer core stream wall means to said outer bypass duct wall means;

first bearing support means disposed radially inwardly of said core stream gas flow path;

first bearing means disposed radially inwardly of said core stream gas flow path and mounted on said first bearing support means, said first bearing means including a first rotatable race;

second bearing means axially spaced from said irst bearing means and mounted on said engine support tructure radially outwardly of the core stream flow ath and including a second rotatable race;

disk support means extending etween and attached to said disk and second rotatable ace and being relatively stiff in the radial irection for transmitting aircraft maneuver loads and entrifugal loads from said disk into said engine upport structure; and drive means connecting said turbine means to said disk for rotating said disk including torque transmitting means secured to said first rotatable race, said torque transmitting means including airfoil shaped strut means rotatable about the engine axis and extending across the flow path of said axial flow compressor means and connected to said disk for rotating said disk and airfoils about the engine axis and for transmitting maneuver loads from said disk into said first bearing support means, wherein the axial location of said disk is such that a major portion of the maneuver loads therefrom are transmitted into said engine support structure, and a minor portion of the maneuver loads therefrom are transmitted into said first bearing support means.

2. The gas turbine engine according to claim 1 wherein said engine support structure is located axially rearward of said disk.

3. The gas turbine engine according to claim 1 wherein said airfoils are variable pitch airfoils, each airfoil having a radially extending axis about which it is adapted to rotate.

4. The gas turbine engine according to claim 3 wherein the plane of said radially extending axes is located axially between said first and second bearing means, but closer to said second bearing means.

5. The gas turbine engine according to claim 3, wherein said airfoils are adapted to rotate about their respective radially extending axes to a reverse thrust position such that air flow through said bypass stream flow path is directed toward the front of said engine.

6. The gas turbine engine according to claim 1, wherein said turbine means includes a rotor and turbine shaft means connected to said rotor and adapted to rotate about said engine axis, wherein said drive means is connected to said shaft means and includes reduction gear means such that said airfoils rotate about said engine axis at a speed less than said shaft means, said compressor means including a plurality of rotors, said reduction gear means being located entirely upstream of said compressor rotors and entirely radially inwardly of said core stream flow path.

7. The gas turbine engine according to claim 1, wherein said torque transmitting means includes means interconnecting said strut means and said disk for transferring torque to said disk, said interconnecting means having insufficient stiffness in the radial direction to transmit substantial centrifugal loads from said disk into said strut means.

8. The gas turbine engine according to claim 7, wherein said means interconnecting said strut means and said disk comprises a thin walled axially extending cylinder.

9. The gas turbine engine according to claim 1 wherein said first bearing means is located axially forward of said second bearing means.

10. A gas turbine engine for an ircraft, said engine having an axis, a front end and ear end, said engine comprisinq, in series flow elationship, axial flow compressor means, combuster eans, and turbine means, and including first wall eans defining a core stream gas flow path having an nlet and including the flow path of said axial flow ompressor means;

inner and outer concentric bypass duct wall means efining a bypass stream flow path therebetween urrounding said core stream gas flow path, said inner ypass duct wall means comprising a rotatable portion;

disk means disposed radially outwardly of said ore stream gas flow path and downstream of said core tream inlet;

a plurality of circumferentially disposed irfoils sucured to said disk means;

drive means connecting said turbine means to said disk means to rotate said disk means and airfoils about said engine axis, includinq torque transmitting means including airfoil shaped strut means rotatable about the engine axis and extending across said compressor means flow path to transmit torque from said turbine means across said compressor means flow path to said disk means, said torque transmitting means having insufficient stiffness in the radial direction to transmit substantial centrifugal loads from said disk means across said compressor means flow path; and stationary engine support structure and bearing eans secured to said structure, said stationary upport structure extending radially outwardly from aid core stream flow path across said bypass stream flow path, said bearing means being disposed radially outwardly of said core stream flow path and having a stationary race and a rotatable race, means interconnecting said disk means and said rotatable race to support said disk means from said rotatable race, said bearing means being adapted to transfer aircraft maneuver loads and centrifugal loads from said disk means into said engine support structure.

11. The gas turbine engine according to claim 10 wherein said airfoils are variable pitch airfoils, each airfoil having a radially extending axis about which it is adapted to rotate.

12. The gas turbine engine according to claim 10 wherein said first wall means includes inner and outer concentric rotatable wall portions downstream of said inlet, said strut means interconnecting said inner and outer rotatable wall portions of said first wall means, said torque transmitting means also including a torque transmitting member flexible in the radial direction interconnecting said strut means and said disk means for transferring torque from said strut means to said disk means.

13. The gas turbine engine according to claim 12 wherein said disk means is spaced axially rearwardly of said strut means, and said torque transmitting member comprises an axially extending thin cylindrical wall having a fron and fixedly connected to said strut means and a rear end fixedly connected to said disk means.

14. The gas turbine engine according to claim 10 wherein said turbine means includes rotor means and turbine shaft means connected to said rotor means and adapted to rotate about said engine axis, wherein said drive means is connected to said shaft means and includes reduction gear means such that said airfoils rotate about said engine axis at a speed less than said shaft means.

15. The gas turbine engine according to claim 11 including means connected to said airfoils for rotating said airfoils about their respective radially extending axes to change the pitch of said airfoils.

16. The gas turbine engine according to claim 14 wherein said compressor means includes a plurality of rotors, and said reduction gear means is located entirely upstream of said compressor rotors and radially inwardly of said core stream flow path.

17. The gas turbine engine according to claim 15 wherein said airfoils are adapted to rotate about their respective radially extending axes to a reverse thrust position such that air flow through said bypass duct means is directed toward the front end of said engine.

18. The gas turbine engine according to claim 10 wherein said torque transmitting means extends across said compressor means flow path forward of said disk means.

* * * * *

UNITED STATES PATENT AND TRADEMARK OFFICE
CERTIFICATE OF CORRECTION

PATENT NO. : 4,704,862

DATED : November 10, 1987

INVENTOR(S) : William D. Dennison and Robert F. Brodell

It is certified that error appears in the above-identified patent and that said Letters Patent is hereby corrected as shown below:

Column 7, line 32, "irst" should be --first--

Column 7, line 34, "tructure" should be --structure--.

Column 7, line 35, "ath" should be --path--.

Column 7, line 36, "etween" should be --between--.

Column 7, line 37, "ace" should be --race--.

Column 7, line 38, "irection" should be --direction--.

Column 7, line 39, "entrifugal" should be --centrifugal--.

Column 7, line 40, "upport" should be --support--.

Column 8, line 30, "ircraft" should be --aircraft--.

Column 8, line 31, "ear" should be --rear--.

Column 8, line 32, "comprisinq" should be --comprising--.

Column 8, line 32, "elationship" should be --relationship--.

Column 8, line 33, "eans" should be --means--.

Column 8, line 34, "eans" should be --means--.

Column 8, line 35, "nlet" should be --inlet--.

Column 8, line 36, "ompressor" should be --compressor--.

Column 8, line 38, "efining" should be --defining--.

Column 8, line 39, "urrounding" should be --surrounding--.

Column 8, line 40, "ypass" should be --bypass--.

Column 8, line 42, "ore" should be --core--.

Column 8, line 44, "tream" should be --stream--.

Column 8, line 45, "irfoils" should be --airfoils--.

UNITED STATES PATENT AND TRADEMARK OFFICE
CERTIFICATE OF CORRECTION

PATENT NO.  : 4,704,862

DATED       : November 10, 1987

INVENTOR(S) : William T. Dennison and Robert F. Brodell

It is certified that error appears in the above-identified patent and that said Letters Patent is hereby corrected as shown below:

Column 8, line 46, "sucured" should be --secured--.

Column 8, line 49, "includinq" should be --including--.

Column 8, line 59, "eans" should be --means--.

Column 8, line 60, "upport" should be --support--.

Column 8, line 61, "aid" should be --said--.

Column 9, line 21, "fron" should be --front--.

Column 9, line 21, "and" should be --end--.

Signed and Sealed this

Seventeenth Day of January, 1989

Attest:

DONALD J. QUIGG

*Attesting Officer*   *Commissioner of Patents and Trademarks*